Sept. 27, 1938.     B. WALKER     2,131,306
MOTOR VEHICLE
Filed April 23, 1936
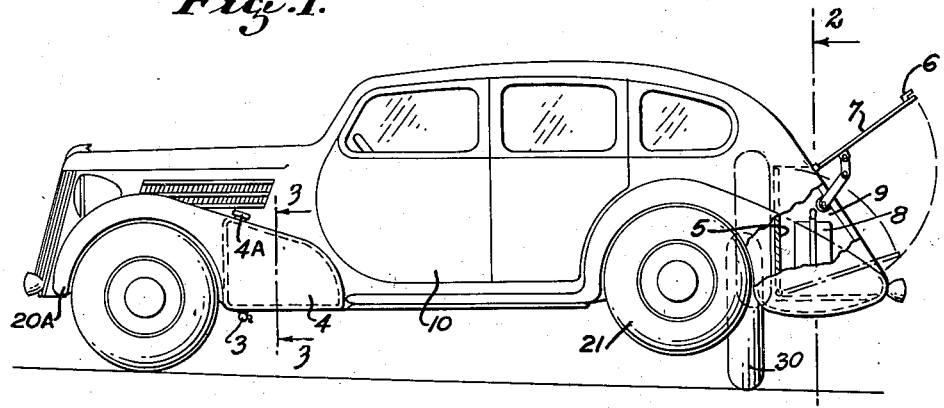
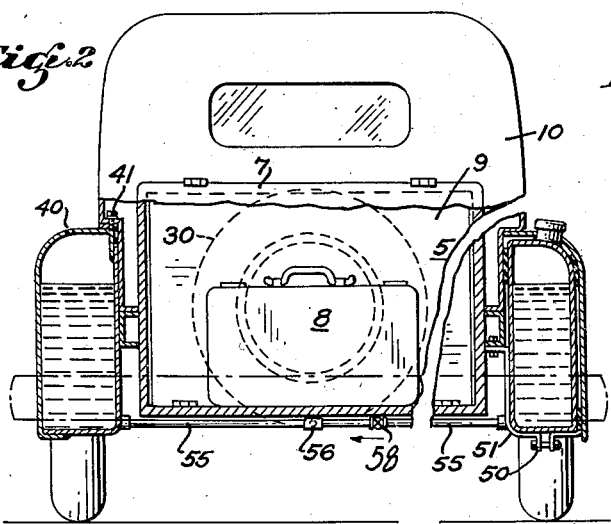
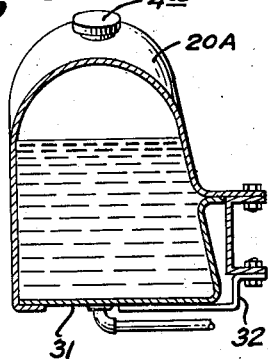
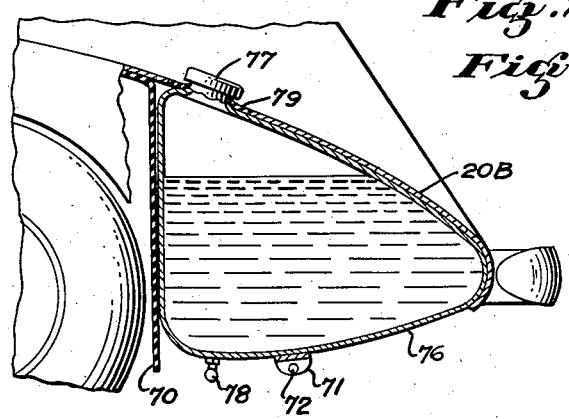
INVENTOR.
Brooks Walker Patented Sept. 27, 1938

2,131,306

UNITED STATES PATENT OFFICE 2,131,306

MOTOR VEHICLE

Brooks Walker, Piedmont, Calif.

Application April 23, 1936, Serial No. 75,925

4 Claims. (Cl. 280—5)

This application is a continuation in part of my co-pending application entitled Motor vehicle filed February 8th, 1935, Serial #5,643 in that part of this disclosure is disclosed in my said co-pending application.

My invention relates to improvements in motor vehicles and particularly fuel tanks and locations, constructions and connections for said fuel tanks; and more particularly to the location of fuel tanks within the contour of the streamlined wheel fenders to thereby allow more useful space in the vehicle for luggage, seating, spare tire, and the like.

Other objects and features of novelty of my invention will be either specifically pointed out or will become apparent when referring, for a better understanding of my invention, to the following description in conjunction with the accompanying drawing, wherein:

Figure 1 is a side elevation partly cut away and partly in section showing a vehicle embodying one form of my invention.

Figure 2 is an end view partly cut away and partly in section of the rear of a vehicle showing one form of fuel tank construction embodying my invention as might be applied to a vehicle as viewed at section 2—2 of Figure 1.

Fig. 2—A is a view of a modified form of fuel tank.

Figure 3 is a partial end view partly in section as at 3—3 of Figure 1 showing one form of my invention.

Figure 4 is a partial view partly in section showing a side cross section of a rear fender fuel tank embodying my invention.

Referring to Figures 1 and 3, I have shown a vehicle 10 having a luggage compartment 9 in which is placed for example's sake a suitcase 8. Said luggage space is reached through a rear opening door 7 provided with a handle 6, as shown in the raised position of Figure 1. Access to the spare tire is gained through the door 5 in the back of the luggage compartment which is hinged at the bottom and opens to the dotted position shown in Figure 1.

In order to improve the size of the luggage compartment 9, to provide suitable space for the spare wheel 30 and its associated mechanism the advantages of which are more specifically pointed out in the application #5,643 above referred to, I have preferred to locate the fuel tank 4 within the streamline rear contour of the front fender or fenders 20—A, said fuel tank can be formed integral with said fender 20—A thereby eliminating extra weight, or may be formed separately and be made removable to facilitate servicing and fender straightening. Said fuel tank may be filled through cap 4—A and is provided with an outlet 3, which in the event of two fuel tanks in each front fender would be connected with the other fuel tank and the carbureter intake would be preferably taken from the lowest point in said connecting line.

While I have shown the fuel tank in connection with the front fenders it may likewise be nested in the rear fender contour. By this location I have taken advantage of the space available in present design and have improved greatly the luggage compartment in connection with an enclosed mounting for the vehicle spare tire. The spare tire and wheel may be moved by a mechanism similar to that described in my co-pending application first referred to.

In Figure 3 I show a cross section through the front fender 20—A in which case the fuel tank and the fender are formed integral. Here I have illustrated one form of accomplishing this by welding, brazing, fusing, or uniting the lower section 31 to the fender 20—A to thereby make the fender form part of the fuel tank. The fender may be fastened to the chassis in the usual manner and may have an auxiliary support 32 under the fuel tank to carry the extra weight if necessary. The tank may be separate, similar to that illustrated in Figure 1, to facilitate service and fender straightening, in which case the tank may be supported with the fender or separately by separate brackets like running board brackets, or by special brackets, or by joint support with the fender, and other supports by any other suitable means.

In Figures 2 and 2—A, I have illustrated two different methods of locating fuel tanks within the contour of the rear wheel fenders and body, and also one means of connecting them together so that one tank only need be filled to fill the other and at the same time providing a single outlet to the engine at 56, which drains from both tanks through lines 55. In this event, and assuming the tank in the right hand fender (not shown in Fig. 2) is provided with a filler spout, a small air vent 40 may be necessary in the left hand tank to prevent air binding when filling or using fuel. In Fig. 2, in which the tank forms an integral part of the fender, I have illustrated a method of attachment for the fender by cap screws as 41, screwing into tapped blind holes, to prevent fuel leakage and eliminate the necessity of nuts within the tank. However, any other suitable method of forming the tank and fender integral and attaching the same to the chassis will be satisfactory and within the scope of this invention.

In Fig. 2—A I have illustrated another form of fuel tank formed separately from the fender and suitably attached to the vehicle as by strap 51 and draw bolt 50 with suitable yielding anti-squeak packing between if necessary to prevent the wracking of the vehicle from stressing the fuel tank to cause it to leak.

It is to be understood that my form of tank may be used in either or both front or rear or front and rear fender as may be advisable from space weight and other considerations as may be advisable and come within the scope of this invention. For example, it might be advisable to place one tank in the right front and another in the right rear fender to offset a spare tire in the left front fender or vice versa. It may be advisable, in securing good fuel supply to locate a check valve as at 58 in line 55 to maintain one tank fuller than the other by road and curve action, in this event, fitting 56 probably should be closer to the left tank than illustrated.

In Figure 4 I have illustrated one form of rear fuel tank 76 construction and location within the contour of the rear fender 20—B with a filler neck and cap 77 protruding through the rear fender which may have a rubber or flexible guard 79 around the neck to improve the appearance of the same. The tank may be attached by bracket 71 and bolt 72 and or any other manner deemed advisable. Outlet 78 may lead to the engine.

It may be advisable to protect the tank from stones, loose tire chains, and the like, and to reduce the noise therefrom to cover the tank with an adhesive resilient substance or place a rubber compound or flexible guard as 70 in front of the fuel tank whether located at the front or rear of the vehicle.

While I have described these tanks as being for fuel, they may, of course, be used for oil, water, or any other liquids which may be desirable to carry, for supplying the vehicle or its passengers, or for the transportation of any liquids. In the latter case, it might be advisable to provide manual outlets at the side thereof, possibly recessed within the tanks or fenders so as to protect the outlet valves and provide access as for water for camping, etc.

There is a further advantage to this location of the fuel tanks than has been previously described, particularly in the use of volatile fuels, and that is the matter of heat, the locations provided herein will probably be cooler than under the front seat or under the luggage compartment near the exhaust and in the path of the hot air from the engine as is at present the practice.

Other uses will be more particularly pointed out in the claims attached hereto. While the description and drawing illustrate, in a general way, certain instrumentalities which may be employed in carrying the invention into effect, it is evident that many modifications may be made in the various details without departing from the scope of the appended claims, it being understood that the invention is not restricted to the particular examples herein described.

The invention claimed is:

1. In an automobile including a body supported on wheels, fenders for said wheels at least one whereof has a side extended downwardly forming a skirt, and has a tank wholly contained therein behind said skirt and of a width substantially equal to the width of the fender.

2. In an automobile including a body supported on wheels, fenders for said wheels at least one whereof has a side extended downwardly forming a skirt, and has a tank wholly contained therein behind said skirt and of a width substantially equal to the width of the fender; and a partition in said one fender interposed between the tank and the associated wheel.

3. In an automotive vehicle including a body supported on wheels, fenders on said wheels at least one whereof has a side extended downwardly forming a skirt, and a liquid tight compartment of a width substantially equal to the width of the fender secured within said fender and wholly contained in said fender behind said skirt.

4. In an automotive vehicle including a body supported on wheels, fenders on the sides of said body in the rear of the vehicle disposed over said rear wheels and having the sides extending downwardly forming a skirt at the rear of each thereof, a tank wholly contained in each of said fenders in the rear of said wheels and behind said skirts, and a luggage compartment in said body disposed between said tanks.

BROOKS WALKER.

Patent No. 2,131,306                          Granted September 27, 1938

BROOKS WALKER

The above entitled patent was extended July 24, 1951, under the provisions of the act of June 30, 1950, for 6 years and 214 days from the expiration of the original term thereof.

*Commissioner of Patents.*